Nov. 17, 1959  W. C. WALL  2,913,034
TUBELESS PNEUMATIC TIRE
Filed June 3, 1955
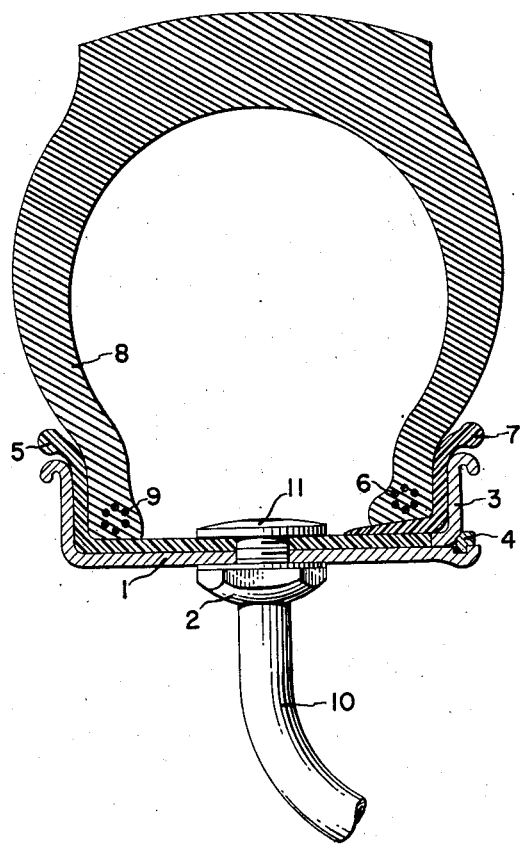
INVENTOR
WILLIAM CARTER WALL
BY
*A. McAleer*
ATTORNEY

United States Patent Office 2,913,034
Patented Nov. 17, 1959

2,913,034

TUBELESS PNEUMATIC TIRE

William Carter Wall, Wilmington, Del., assignor to E. I. du Pont de Nemours and Company, Wilmington, Del., a corporation of Delaware Application June 3, 1955, Serial No. 513,063

3 Claims. (Cl. 152—366)

This invention relates to an improvement in tubeless pneumatic tires.

Tubeless pneumatic tires have been known for many years (cf. the Litchfield patent, U.S. 736,414, issued August 18, 1903), but they have never achieved the widespread commercial success which has characterized tires adapted for use with separate inner tube members. Generally speaking, it has not been practical heretofore to attach the valve stem of the pneumatic tire assembly directly to the steel rim base, and to inflate the tire without use of an inner tube member, because the tire rim could not be made to form an air tight seal with the tire beading. This was especially true in the case of truck tires, particularly those having detachable rim rings to lock the outboard flange member in position.

The present invention is directed to an improved pneumatic tubeless tire assembly, characterized in that it has an air tight seal between the tire and the rim, said seal having as one of its elements an intervening liner of flexible, impermeable material, particularly high molecular weight plastic material, such as nylon, polyethylene or polyoxymethylene resin, or other like high molecular weight synthetic resin. The base of the tire bead should preferably not be parallel with the rim base, but should taper in at an angle of about 10 to 20° therewith. The surface of the liner with which the base of the bead comes into contact should also be at a similar angle with respect to the rim base. This assures a tight seal.

The invention, in a specific embodiment, is illustrated further by means of the accompanying drawing, which shows a steel tire rim 1, having a vent 2 to engage a valve stem, a detachable outboard flange member 3 and split locking ring 4 for said flange member, a nylon liner 5 for the rim, adapted to fit snugly on the tire side of one flange portion of the rim and also against the tire side of the rim base, and extending across towards the other flange portion at least far enough to be under the tire bead 6 on the outboard side, a nylon liner 7 fitting snugly against the tire side of the outboard flange and extending under the tire bead 6 on the outboard side, the upper surface of said liner being adapted to fit snugly against the base of the tire bead, and tapering in at an angle of 10 to 20° to the rim base, a tire 8 having bead portions 6 and 9 which fit snugly against the liners 5 and 7, a valve stem 10 communicating with the space enveloped by the tire, through the vent 2 and a correspondingly positioned vent 11 in the liner 5.

Under ordinary conditions of operation the tire is inflated to a suitable pressure, e.g. 60 pounds per square inch. As the pressure increases the base of the tire bead is more firmly pressed against the plastic liner, forming a tighter seal. Actual tests prove that an excellent seal is thus produced.

If desired, the surface of the tire at the portions which come into contact with the liners should be of relatively soft rubber. In certain embodiments, both tire beads and the corresponding liner surfaces can be tapered in, or the base of one of the beads may be parallel with the rim base while the other is tapered in, the liners being correspondingly shaped.

The advantages of the rim seal hereinabove described reside primarily in eliminating the need for any inner tube member, and eliminating danger due to pinching or folding of such inner tubes. Repair of small punctures is greatly simplified, and the overall assembly is of simpler, cheaper construction.

What is claimed is the following:

1. A tubeless tire assembly comprising a tire rim having a non-detachable flange portion contiguous with a rim base, a beaded tire mounted over said rim base, a rim liner composed of high molecular weight synthetic resin separating said tire from said rim, said liner being flexible and adapted to fit snugly against said non-detachable flange portion and also against the tire side of the rim base, said resin being impermeable to air, a valve stem mounted in said rim and said rim liner, and communicating with the space enveloped by the tire through a vent in said liner, said liner separating the tire from the rim extending across the rim and under both tire beads, a detachable outboard flange member, a split locking ring for said outboard flange member, and an outboard flange liner which is flexible, and made of material which is impermeable to air, and which is adapted to fit snugly on the tire side of said outboard flange member and extending under the outboard tire bead in sealing relationship therewith, separating said outboard tire bead from the aforesaid rim liner and adapted also to form a seal with the outboard flange member and the aforesaid rim liner.

2. Tire assembly of claim 1 wherein said liners are made of nylon.

3. Tire assembly of claim 1 wherein said outboard flange liner engages a tire bead base at an angle which tapers in toward the rim base, said angle being within the range of 10° to 20°.

References Cited in the file of this patent

UNITED STATES PATENTS

| | | |
|---|---|---|
| 1,886,470 | Daddio | Nov. 8, 1932 |
| 2,731,063 | Powers | Jan. 17, 1956 |
| 2,731,064 | Powers | Jan. 17, 1956 |
| 2,822,017 | Herzegh | Feb. 4, 1958 |

FOREIGN PATENTS

| | | |
|---|---|---|
| 1,026,545 | France | Feb. 4, 1953 |
| 691,981 | Great Britain | May 27, 1953 |
| 692,019 | Great Britain | May 27, 1953 |